(12) United States Patent
Ristow et al.

(10) Patent No.: US 6,387,469 B1
(45) Date of Patent: May 14, 2002

(54) COMPOSITE PART AND METHOD FOR PRODUCING THE SAME

(75) Inventors: Lutz Ristow, Radgasse; Wolfgang Holzapfel, Röthebach/Pegnitz; Reinhold Stegschuster, Halbergmoos, all of (DE)

(73) Assignee: DaimlerChrysler Rail Systems GmbH (DE)

( * ) Notice: Subject to any disclaimer, the term of this patent is extended or adjusted under 35 U.S.C. 154(b) by 0 days.

(21) Appl. No.: 09/403,155

(22) PCT Filed: Jan. 16, 1999

(86) PCT No.: PCT/EP99/00231

§ 371 Date: Oct. 15, 1999

§ 102(e) Date: Oct. 15, 1999

(87) PCT Pub. No.: WO99/42350

PCT Pub. Date: Aug. 26, 1999

(30) Foreign Application Priority Data

Feb. 17, 1998 (DE) .......................................... 198 06 484

(51) Int. Cl.[7] ................................................ B32B 3/12
(52) U.S. Cl. ..................... 428/116; 428/593; 428/73; 29/897; 29/428
(58) Field of Search ................................ 428/116, 118, 428/593, 73; 29/592, 897, 897.3, 897.31, 897.32, 428, 525.01, 527.1, 897.2

(56) References Cited

U.S. PATENT DOCUMENTS 5,685,229 A  11/1997  Ohara et al. ................. 105/397

FOREIGN PATENT DOCUMENTS

| DE | 3643688 | 7/1987 |
| EP | 0405889 | 1/1991 |
| EP | 0544498 | 11/1992 |
| EP | 0582544 | 2/1994 |
| EP | 0644096 | 3/1995 |
| JP | 3090468 | 4/1991 |
| JP | 7144380 | 6/1995 |
| JP | 7189419 | 7/1995 |
| WO | 9518014 | 7/1995 |

*Primary Examiner*—Deborah Jones
*Assistant Examiner*—Wendy Boss
(74) *Attorney, Agent, or Firm*—Webb Ziesenheim Logsdon Orkin & Hanson, P.C.

(57) ABSTRACT

This invention comprises a composite part (1) consisting of a top (11) and bottom (12) metal cover layer and a sandwich component (10) that comprises a core (13) made of a honeycomb structure, and at least one metal profile (20) equipped with a connecting surface (21) for the discharge of forces into the sandwich component (10), whereby the profile or profiles are joined to the sandwich component in a flat manner, and a method for its manufacture.

6 Claims, 1 Drawing Sheet

COMPOSITE PART AND METHOD FOR PRODUCING THE SAME

BACKGROUND OF THE INVENTION

1. Field of the Invention

This invention relates to a composite parts, as well as a method for the manufacture of such a composite part.

2. Brief Description of the Prior Art

Constructions that utilize the sandwich principle are characterized by high flexural strength and simultaneously by low weight. For this reason, the use of these components has become very common in the transportation industry, and in particular in the railroad industry. For structures that are subjected to high loads, it is logical to manufacture these sandwich composites from metal materials.

To connect additional components to the sandwich components, or to connect different sandwich components to one another at any desired angles, profiles are integrated for the discharge of forces and for the attachment of connecting points. Larger sandwich components are constructed by connecting a plurality of smaller sandwich components, which are called basic components below, into a large sandwich component, as a function of the requirements of the specific application.

EP 0 544 498 discloses composite parts made of sandwich components and profiles for the discharge of forces, in which the profiles are welded to a web that stands perpendicular to the cover layer of the sandwich component between two basic components that are butt-welded to each other on their ends. This system uses a reinforcement for the attachment of the profiles, which reinforcement results from the fact that both the sandwich components and the basic components are normally closed and are reinforced in their terminal area by U-shaped reinforcement profiles with the open area pointing outward and inserted in place of the core. With this type of attachment, the weld seam is along the contact points between the cover surface and the profile.

In a composite part disclosed in EP 0 644 096, the profiles are welded to a connecting surface either on the edge on the connecting area between two basic components that are reinforced with U-shaped reinforcement profiles, or are riveted to the cover layer which is underlaid with hollow reinforcement profiles.

In all the composite parts of the prior art, the profile is welded or riveted to the sandwich component, as a result of which there is a spot or linear discharge of forces from the profile into the sandwich component. However, such a construction requires that the sandwich component be reinforced in the vicinity of the weld. The reinforcement is created by extra hollow reinforcement profiles instead of the metal core, or by U-shaped reinforcement profiles in the vicinity of the butt weld between two basic components.

One disadvantage of such composite parts is the difficulty of constructing large components with a plurality of profiles for the discharge of forces. Large components, such as the side walls of a railroad car, for example, must either be constructed from many small composite parts, so that the profiles for the discharge of forces can be placed at the butt joints, or the sandwich components must be provided in advance at the appropriate locations with hollow reinforcement profiles instead of the core. In all cases, it is no longer possible to subsequently attach profiles for the discharge of forces, unless a reinforcement profile has been provided at the appropriate points. It is also expensive and time-consuming to construct larger components from many small composite parts. Joint corrosion or contact corrosion problems also occur at the weld seams or rivet connections and have a significant effect on the useful life of the components.

The object of this invention is to create a composite part that consists, of a sandwich component and one or more profiles for the discharge or forces, with which it is possible to construct larger components, on which a plurality of force discharge points are required, from a few large composite parts. It must also be possible, on the composite parts, to subsequently attach profiles at any desired points without adversely affecting the discharge of forces.

SUMMARY OF THE INVENTION

The composite part as claimed by the invention makes it possible to easily manufacture components that have a plurality of profiles for the discharge of forces, by optimally adapting the dimensions of the composite part, plus the profiles, to the dimensions of the component to be formed, without having to interrupt and reconnect the sandwich components at the force discharge points, which significantly simplifies the process of constructing the components and results in cost reductions. The profiles for the discharge of forces are connected to the sandwich component after the sandwich component has been optimally adapted, in terms of its dimensions, to the component to be formed. Because the locations of the connections of the profile for the discharge of forces are independent of the location of the butt joints or the reinforcement points of the sandwich components, additional profiles can be connected to the existing composite part at any later time as necessary, which increases the variability of the composite parts. The quality of the connection between the profile and the sandwich component is also improved by the flat connection of the profiles, as a result of which the construction of the composite parts is stabilized. It also becomes possible to increase the useful life by preventing corrosion in the gaps at the connections or contact corrosion at the joints.

For the flat connection of the profiles to the sandwich components, the sandwich components have at least one connecting surface adjacent to the cover layer. The overall geometry of the profiles used is adapted to the specific application. Depending on whether additional parts are welded, bolted or riveted on, the profiles have additional areas or T elements or slotted cavities for the attachment of a bolt head or rivet head. This shaping can be advantageously achieved by using extruded profiles as the force-discharge elements.

The flat connection, which has advantages over the welding of the profiles to the reinforced sandwich components, can then be accomplished by gluing the profile to the sandwich component, although the metal profile is preferably soldered to the metal cover layer. As a result, an improved adhesive bond is achieved, in particular if the structure is likely to be exposed to severe vibrations.

The following part of the description relates to a method for the manufacture of the composite part claimed by the invention.

A method disclosed in EP 0 405 889 describes the manufacture of composite parts in which, in a first step, the sandwich components are fabricated with reinforcements in the positions provided for the profiles or with butt joints between basic components that are reinforced in the peripheral area, and in a second step the profiles are welded to the reinforced areas with at least one seam.

The first step in the method of EP 0 405 889, in addition to the actual manufacture of the sandwich components, includes additional operations, because the reinforcements must be attached to the positions provided for the profiles, which interrupts the insertion of the metal core and makes the manufacture of sandwich components reinforced in this manner very complex, time-consuming and expensive. Moreover, the reinforcement profiles cannot be installed at any desired angle with respect to the honeycomb structure, which represents a limiting of the potential applications. The manufacture of sandwich components that are made of basic components butted up against each other also increases the cost and time required for the completion of the first step. If a plurality of weld seams are used to fasten the profile to the reinforced sandwich component, the number of operations in the second step must also be increased accordingly.

The object of the present invention is also a method for the manufacture of a composite part as claimed by the invention that consists of the sandwich component and the profile for the discharge of forces, in which the number of steps in the method and the number of operations included in these individual steps are minimized.

The present invention teaches that the profile or profiles are connected to the sandwich part during the process of manufacturing the sandwich component.

In this method as claimed by the invention, it is advantageous that the simultaneous manufacture of the sandwich components and the connection of the profiles eliminates the entire second step in the operation. Because the profiles can be connected to the honeycomb structure of the core even in areas where there are no reinforcement profiles and without considering a specific orientation with respect to the honeycomb structure of the core, it is also possible to use the method claimed by the invention to fabricate composite parts with profiles that are oriented in any desired position.

During the manufacture of the sandwich component, the parameters of this process are utilized to connect the profile to the sandwich component. Because the cover layers and the honeycomb core are metal components, it is advantageous to connect the cover layers to the core by soldering. It is particularly advantageous if solder-plated cover layers are used to solder the cover layers to the core. Once the solder-plated side has come in contact with the metal core, the soldering process proceeds when the components have been heated to a temperature that is above the melting point of the solder in the absence of air, in particular in a vacuum. The solder becomes liquefied and accumulates at the points of contact between the cover layer and the webs of the honeycomb-shaped structure of the core, so that a soldered sandwich component is formed as the structure cools.

The parameters of the manufacturing process of the sandwich component—such as the temperature that occurs—can be utilized to simultaneously connect the profile to the sandwich component. For this purpose, the profile is also preferably soldered to the sandwich component. In the method claimed by the invention, cover layers are preferably used which are solder-plated on the side facing the profile, so that as a result of the temperature that is achieved during the manufacturing process, the solder on this side of the cover layer is also liquefied, and in the absence of air accumulates at the points of contact between the profile and the cover layer. As a result, when the composite part cools, there is a flat connection between the profile and the sandwich component. The following description indicates additional details, features and advantages of the invention.

BRIEF DESCRIPTION OF THE DRAWINGS

The FIG. 1 shows a composite part that consists of a sandwich component and a profile that is connected to it in a flat manner for the discharge of forces.

DETAILED DESCRIPTION OF THE PREFERRED EMBODIMENT

Figure 1:
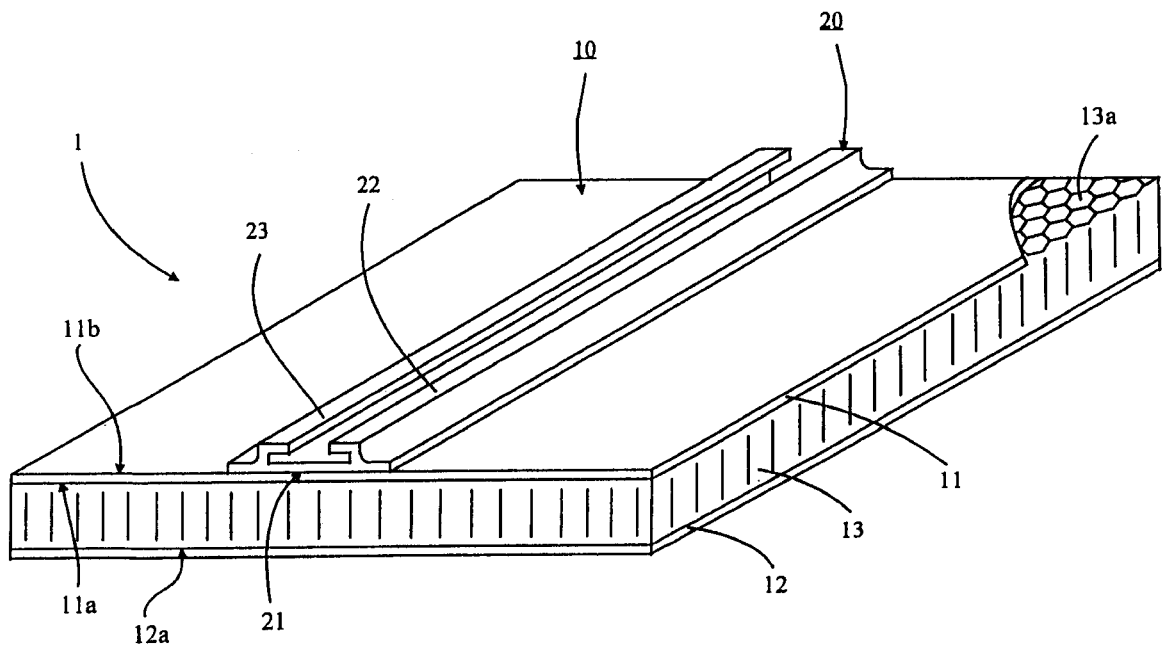

The exemplary embodiment illustrated in FIG. 1 is a composite part 1 that comprises a sandwich component 10 and a profile 20 that is connected to it for a discharge of forces. The sandwich component is constructed from a top cover layer 11, a bottom cover layer 12 and a metal core 13. The core 13 is attached between the cover layers 11, 12 and is formed by a plurality of honeycombs 13a that are connected together. As a result of this construction, the sandwich component has high flexural strength and simultaneously low weight.

As a result of the use of top and bottom cover layers 11, 12, which have solder-plated sides 11a, 12a facing the metal core 13, the manufacture of the sandwich components or of the composite parts is simplified by heating the stack under a vacuum to above the melting temperature of the solder, as a result of which the solder accumulates at the points of contact between the honeycomb 13a and the top cover layer 11 and the bottom cover layer 12, thereby firmly joining the stack during the cooling portion of the soldering process.

By means of this process, and simultaneously with the manufacturing process for the sandwich component, the profile 20 is also soldered to the outer side 11b of the top cover layer 11. The outer side 11b of the top cover layer 11 is also solder-plated, and the profile 20 is placed in the appropriate position. The process for connecting the profile 20 to the connecting surface 21 on the top cover layer 11 takes place simultaneously with the manufacturing process of the sandwich component 10. When the temperature rises to above the melting temperature of the solder, the solder of the solder-plated outer side 11b accumulates on the connecting surface 21, and as the structure cools, connects the profile 20 to the sandwich component 10. It is also possible, however, to solder-plate only the areas of the outer side 11b of the top cover layer 11 that subsequently come into contact with a profile.

In FIG. 1 exemplary embodiment illustrated in the, the profile 20, in addition to the connecting surface 21, has two additional jaws 22, 23 which define a T-shaped area that either holds a flat component perpendicular to the sandwich component, or in which there can be a plurality of bolts with their heads in the T-shaped area for the attachment of supports or similar items. Naturally, for a wide variety of applications for the discharge of forces into the composite part claimed by the invention, profiles can also be connected that have geometries that are different from the connecting surface 21.

What is claimed is:

1. A composite part comprising:
  a sandwich component having a top metal cover layer, a bottom metal cover layer and a core made of a honeycomb structure; and
  at least one metal profile equipped with a connecting surface for the discharge of forces into the sandwich component;
    wherein one of the top metal cover layer and the bottom metal cover layer is solder-plated on a side facing the at least one metal profile; and
    wherein the at least one metal profile is soldered to the sandwich component in a flat manner.

2. The composite part as claimed in claim 1 wherein the profile is realized in the form of an extruded profile.

3. A method for the manufacture of a composite part, comprising the steps of:
  fabricating a sandwich component by soldering a top metal cover layer and a bottom metal cover layer to a metal core; and connecting at least one metal profile to a sandwich component;
  wherein at least one of the top metal cover layer and the bottom metal cover layer comprise a solder-plated side facing outward from the sandwich component; and
  wherein the at least one metal profile is soldered on the solder-plated side to the sandwich component in a flat manner.

4. The method as claimed in claim 3, wherein the at least one metal profile is soldered to the sandwich component during the process of fabricating the sandwich component.

5. The method as claimed in claim 3 further comprising the step of:
  attaching the top and bottom metal cover layers, each having two solder-plated sides, to the core,
  wherein soldering is carried out in a vacuum at a temperature that is above the melting point of solder.

6. The method as claimed in claim 3, wherein the soldering of the metal profile is carried out in a vacuum at a temperature that is above the melting point of solder on the solder-plated side.

\* \* \* \* \*